(No Model.)
R. C. SMITH.
CAR STARTER.
No. 262,251. Patented Aug. 8, 1882.
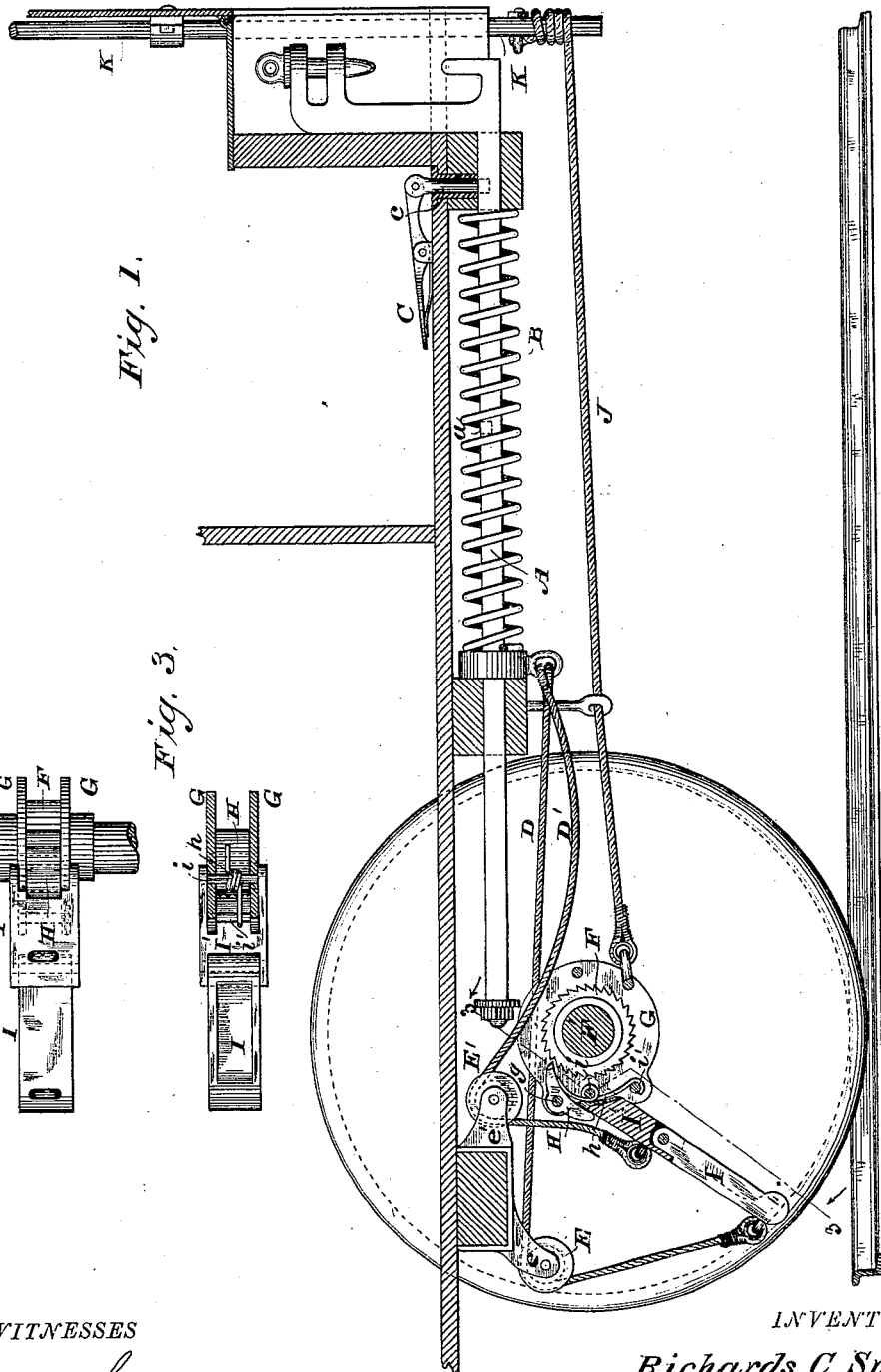
WITNESSES
Wm. A. Skinkle.
Edwin A. Newman.
By his Attorneys
INVENTOR
Richards C. Smith

UNITED STATES PATENT OFFICE.

RICHARDS C. SMITH, OF BALTIMORE, MARYLAND.

CAR-STARTER.

SPECIFICATION forming part of Letters Patent No. 262,251, dated August 8, 1882.

Application filed June 24, 1882. (No model.)

*To all whom it may concern:*

Be it known that I, RICHARDS C. SMITH, of Baltimore city, in the State of Maryland, have invented certain new and useful Improvements in Car-Starters, of which the following is a specification.

My invention relates to improvements in car-starting devices of the class which are actuated with graduated power by the draft of the team, so that at first starting a car a slow motion is imparted to it with least strain, and, after initial inertia is so overcome, the motion is increased without necessitating an increase of speed or over-exertion of the team.

In United States Letters Patent granted me July 19, 1881, No. 244,680, a car-starter of this class is shown. As in some features the mechanism shown in connection with my present invention corresponds with parts of my prior patented invention, particular reference is hereby made to said Patent No. 244,680.

The improvements deemed novel will hereinafter particularly be pointed out.

In the accompanying drawings, which show so much only of an ordinary horse-car as is deemed requisite to a proper illustration of my improvements, Figure 1 is a longitudinal vertical section, showing a portion of the framework of a car and one of the wheels and axles with my improvements applied. Fig. 2 is a plan or top view of a portion of the axle, with the ratchet-wheel thereof and the ratchet-engaging pawl and its actuating-lever, the lever being represented as in the position assumed by it when rocked upward, so as to extend horizontally, or nearly so, in rear of the axle. Fig. 3 is a view showing parts in section, as indicated by the line 3 3 of Fig. 1.

As described and shown in my before-referred-to patent, No. 244,680, a sliding draw-bar, A, its spring B, and a treadle, C, with its spring and arm c to engage the draw-bar notch a, are provided, and two ropes or chains, D D', are connected with the draw-bar, as set forth in said patent, for operating the starting mechanism. These ropes pass over pulleys E E', mounted in lugs or bracket-arms e e', secured to the under side of the car-body or cross-beam thereof.

The lever, pawl, and ratchet of the starting mechanism, instead of being constructed and arranged as before shown, are as follows: The ratchet F is fixedly attached to the axle F' between the two rocking plates G G, which are mounted loosely on the axle at the sides of the ratchet and connected by rivets or cross-pins, as shown. These plates constitute a lever-support and pawl-carrier. The pawl H is mounted to rock upon the plate uniting or connecting pin g, and is acted upon by a spring, h, secured in proper position by the plate-uniting pins i i'. The pawl is acted upon by its spring with a tendency to rock the nose or ratchet-engaging end of the pawl away from the ratchet.

A pawl-actuating lever is pivoted by the pin i to its rocking support on the axle. The heel of the lever projects under and bears against the heel-projection of the pawl, so that by rocking the lever upward the pawl will be caused to engage the ratchet. The lever is made in two or more sections—in this instance in two sections—I I', the inner or heel section, I', being shown as somewhat shorter than the outer section, I, and the cords D D' are connected the one with the outer and the other with the inner section of the jointed lever.

It will be seen that upon starting a team attached to the draw-bar the draft is applied first through the taut rope and by way of the outer end of the lever to the pawl-and-ratchet devices, and that, when the car is started or begins to move and the rope D' is drawn taut by the slide of the draw-bar, the power as applied by the shorter leverage is decreased and the speed of the car proportionately increased. The draft is applied direct as soon as the limit of movement of the draw-bar is reached, as will be readily understood, and as fully explained in my former patent, No. 244,680.

By employing the jointed lever and rendering it rigid against flexing upward when the rope D is being drawn upon to start the car, and connecting the rope D' with the lever inside of its joint, instead of with the pawl-carrier, I am enabled to properly graduate the power applied in starting without unduly increasing the size or weight of the pawl-carrier or rocking plates G G, and without imparting to the outer section of the lever any upward movement when the rope D' is strained to flex the lever.

The lever is suitably counterbalanced, so as, under usual circumstances, to return it to its inoperative position after being elevated and when the draw-bar is slid backward. In event of failure of the lever to rock downward when released from strain by the draw-ropes, it may be positively moved into the position in which it is shown in Fig. 1, and so as to be ready for starting, by means of a rope or chain, J, attached to the plates G G by one of the pins by which the plates are united, and connected with the ordinary brake-shaft, K, or with an independent shaft rotating about a vertical axis and controlled by the driver of the car by a crank.

The pull-rope J may be secured to a sheave fixed on the shaft K, instead of being attached so as to wind directly on the shaft.

Should there be more than two sections in the lever, each section would of course have its rope and the pulley over which to pass it to the draw-bar.

I claim as of my own invention—

1. The combination of the draw-bar, the ropes connected therewith, the jointed lever pivoted to rock about the axle, and to the inner and outer sections of which the ropes are attached, the pawl rocking with the lever, and the ratchet on the axle, substantially as and for the purpose hereinbefore set forth.

2. The combination of the axle, the ratchet thereon, the pawl, the pawl-carrier, the lever pivoted to the pawl-carrier and abutting against the pawl when rocked upward, the ropes D D', and the pulleys around which they pass, substantially as and for the purpose hereinbefore set forth.

In testimony whereof I have hereunto subscribed my name.

RICHARDS C. SMITH.

Witnesses:
GEO. McCAFFRAY,
L. H. ROBINSON.